(12) United States Patent
Bagchi et al.

(10) Patent No.: US 8,601,030 B2
(45) Date of Patent: Dec. 3, 2013

(54) METHOD FOR A NATURAL LANGUAGE QUESTION-ANSWERING SYSTEM TO COMPLEMENT DECISION-SUPPORT IN A REAL-TIME COMMAND CENTER

(75) Inventors: Sugato Bagchi, White Plains, NY (US); Laura Wynter, Westport, CT (US)

(73) Assignee: International Business Machines Corporation, Armonk, NY (US)

( * ) Notice: Subject to any disclaimer, the term of this patent is extended or adjusted under 35 U.S.C. 154(b) by 2 days.

(21) Appl. No.: 13/228,709

(22) Filed: Sep. 9, 2011

(65) Prior Publication Data

US 2013/0066886 A1 Mar. 14, 2013

(51) Int. Cl.
*G06F 7/00* (2006.01)
*G06F 9/44* (2006.01)

(52) U.S. Cl.
USPC ............................................ 707/802; 706/52

(58) Field of Classification Search
None
See application file for complete search history.

(56) References Cited

U.S. PATENT DOCUMENTS

| | | | |
|---|---|---|---|
| 5,068,789 A * | 11/1991 | van Vliembergen | 704/9 |
| 7,957,991 B2 | 6/2011 | Mikurak | |
| 7,993,267 B2 | 8/2011 | Ilif | |
| 2004/0247748 A1 * | 12/2004 | Bronkema | 426/106 |
| 2004/0264677 A1 * | 12/2004 | Horvitz et al. | 379/265.02 |
| 2005/0033617 A1 * | 2/2005 | Prather et al. | 705/7 |
| 2006/0080107 A1 * | 4/2006 | Hill et al. | 704/275 |
| 2006/0106796 A1 * | 5/2006 | Venkataraman et al. | 707/6 |
| 2006/0287901 A1 * | 12/2006 | Grad et al. | 705/7 |
| 2007/0208579 A1 * | 9/2007 | Peterson | 705/1 |
| 2009/0162824 A1 * | 6/2009 | Heck | 434/322 |
| 2009/0228264 A1 * | 9/2009 | Williams et al. | 704/9 |
| 2009/0319295 A1 | 12/2009 | Kass-Hout et al. | |
| 2010/0217638 A1 | 8/2010 | Dickson et al. | |
| 2011/0106698 A1 | 5/2011 | Isaacson et al. | |
| 2011/0175750 A1 | 7/2011 | Anderson et al. | |
| 2012/0041950 A1 * | 2/2012 | Koll et al. | 707/728 |
| 2013/0041921 A1 * | 2/2013 | Cooper et al. | 707/780 |

OTHER PUBLICATIONS

Schipiura et al. "Application of Web-Business with Ontology Constructed From Database Contextualization", Proceedings of the Ninth International Conference on Computer Supported Cooperative work in Design, 2005, pp. 1211-1216.

Amos et al, "Ambient Intelligence—The Next Step for Artificial Intelligence," Intelligent Systems, IEEE, vol. 23, Issue: 2, 2008, pp. 15-18.

Xingang et al., "Intelligent Decision Support System Based on Natural Language Understanding," International Conference on Management and Service Science, 2009, MASS '09, pp. 1-4.

O'Leary, "The Internet, Intranets, and the AI Renaissance," Computer, vol. 30, #1, 1997, pp. 71-78.

Estroff et al., "Intranet-based management of satellite control center operations," Aerospace Conference Proceedings, 2000 IEEE, vol. 2., pp. 467-472.

* cited by examiner

*Primary Examiner* — Tarek Chbouki
(74) *Attorney, Agent, or Firm* — Gibb & Riley, LLC

(57) ABSTRACT

System and methods provide decision support by receiving suggested actions from a decision support system and automatically determining parameters of the suggested actions to serve as input to a question-answering system. System and methods also automatically generate questions based on the parameters, automatically search a corpus of unstructured data to retrieve answers to the questions, and automatically provide impact confidence values for each answer indicating the degree of impact the answers have on the suggested actions. The systems and methods can then output the questions, answers, and impact confidence values.

25 Claims, 9 Drawing Sheets

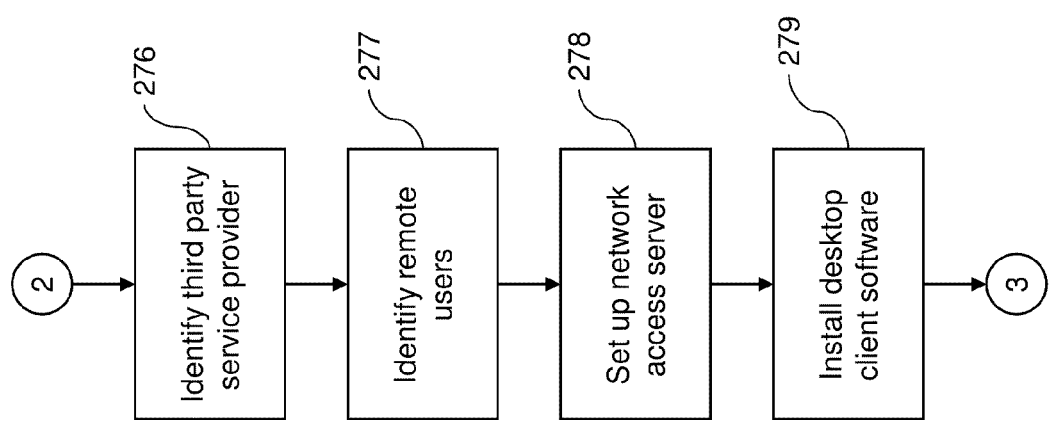

METHOD FOR A NATURAL LANGUAGE QUESTION-ANSWERING SYSTEM TO COMPLEMENT DECISION-SUPPORT IN A REAL-TIME COMMAND CENTER

BACKGROUND

The present disclosure relates to decision support systems and more particularly to machines and methods that automatically determine parameters of the suggested actions to serve as input to a question-answering system that automatically generates questions, retrieves answers to such questions, and outputs impact confidence values for each answer indicating the degree of impact the answers have on the suggested actions.

Conventional decision support systems (such as those designed for a real-time command center) recommend optimized action plans to operators. Exemplary real-time command centers include traffic command centers, public transport command centers, emergency services command centers, and multiple-agency, or the so-called "smarter city" command centers. There are various ways in which such decision support systems (DSS) operate. In some cases, the DSS make use of rule-based, or so-called expert, systems which contain a series of "if-then" clauses to determine which actions are suggested at which times. In other cases, the DSS run a limited set of traffic simulations in real-time, based on the current conditions, to determine which decisions provide the best outcome, in simulation, and the DSS suggests those control actions to the operations staff. A DSS can include both offline and online phases, where the offline phase runs many simulations to determine likely outcomes, and the online phase uses simpler models allowing a faster response to a wider variety of actions and combinations.

SUMMARY

An exemplary method for providing decision support herein receives (into a particular computerized machine) suggested actions from a decision support system and automatically determines parameters of the suggested actions (using the particular computerized machine) to serve as input to a question-answering system operating on the particular computerized machine. This exemplary method also automatically generates questions based on the parameters, automatically searches a corpus of unstructured data to retrieve answers to the questions, and automatically provides impact confidence values for each answer indicating the degree of impact the answers have on the suggested actions (all using the question-answering system). The method can then output the questions, answers, and impact confidence values using a graphic user interface of the particular computerized machine.

Another method for providing decision support for a command center herein receives suggested actions from the decision support system into the particular computerized machine. This exemplary method automatically determines parameters of the suggested actions (using the particular computerized machine) to serve as input to the question-answering system operating on the particular computerized machine. This exemplary method also automatically generates questions based on the parameters (using the question-answering system) and automatically searches a corpus of unstructured data to retrieve answers to the questions, again using the question-answering system. The method then automatically provides impact confidence values for each answer indicating the degree of impact the answers have on the suggested actions (using the question-answering system); and similarly automatically provides relevance confidence values for each answer indicating the degree of relevance the answers have to the suggested actions (using the question-answering system). If the answers have an impact confidence value and a relevance confidence value that are above predetermined confidence thresholds, this method causes the decision support system to reproduce an action plan with modified suggested actions instead of performing outputting of the questions. The modified suggested actions are different than the suggested actions, because the modified suggested actions are based on a re-run action plan performed using the questions, the answers, and the impact confidence values, and the relevance confidence values. However, if the answers have an impact confidence value and a relevance confidence value that are below the predetermined confidence thresholds, this method outputs the questions, the answers, the relevance confidence values, and the impact confidence values on the graphic user interface, without causing the decision support system to reproduce the action plan.

A computerized machine embodiment for providing decision support for a command center herein includes an input/output port receiving suggested actions from a decision support system into a particular computerized machine. Also, a processor is operatively connected to the input/output port. The processor automatically determines parameters of the suggested actions to serve as input to a question-answering system operating on the computerized machine. The question-answering system automatically generates questions based on the parameters and then automatically searches a corpus of unstructured data to retrieve answers to the questions. Further, the question-answering system automatically provides impact confidence values for each answer indicating the degree of impact each answer will have on the suggested actions. Additionally, a graphic user interface is operatively connected to the processor. The graphic user interface outputs the questions, the answers, and the impact/relevance confidence values to the user.

Non-transitory computer readable storage medium embodiments herein are readable by a computerized device. The non-transitory computer readable storage medium stores instructions are executable by the computerized device. The instructions perform a method for providing decision support herein that receives suggested actions from a decision support system and automatically determines parameters of the suggested actions to serve as input to a question-answering system operating on the computerized device. This exemplary method also automatically generates questions based on the parameters, automatically searches a corpus of unstructured data to retrieve answers to the questions, and automatically provides impact confidence values for each answer indicating the degree of impact the answers have on the suggested actions. The method can then output the questions, answers, and degree of impact levels using a graphic user interface of the computerized device.

Thus, this disclosure relates to the use of a question answering system integrated into or with a real-time command center decision support system (DSS). Conventionally, a DSS is strictly a rule-based system that takes structured data and provides recommended actions or alerts. However, much useful data for a real-time command center exists in unstructured formats in the form of news articles, event feeds, blogs, social networking tools, etc. Thus, this disclosure presents a sophisticated question-answering system that processes this unstructured data, along with recommendations from the DSS, and provides impact levels of such findings.

BRIEF DESCRIPTION OF THE SEVERAL VIEWS OF THE DRAWINGS

The embodiments of the disclosure will be better understood from the following detailed description with reference to the drawings, which are not necessarily drawing to scale and in which:

FIG. 9 is a schematic diagram of a virtual private network system according to embodiments herein.

DETAILED DESCRIPTION

As discussed above, Decision Support Systems (DSS) such as those used for a real-time command center, use real-time data and models or algorithms, some of which are calibrated with historical data during an off-line phase. This historical data is available in structured form, enabling its use by rule-based or expert systems, mathematical simulation and optimization techniques employed within a DSS. Examples of such structured data include traffic speeds, volumes, occupancy levels, traffic signal settings, public transport schedules and delays, and incidents on the roads or public transport facilities, among others.

In addition to such structured data, the urban environments in which these command centers exist also generate a large amount of unstructured information that could often be relevant to the recommended action plans. Examples of unstructured data include natural language news articles, blogs, event feeds, and other forms of communications between urban residents. In addition, communications from other city departments and commercial organizations are often in the form of natural language notices and alert posts.

In view of this, the embodiments herein provide to the decision support systems the ability to evaluate a recommended action plan in the light of this unstructured information. More specifically, the methods and systems (particular machines) herein provide the ability to quickly identify, in a real-time setting, the relevant information from amongst the potentially huge amounts of unstructured information available.

Figure 1:
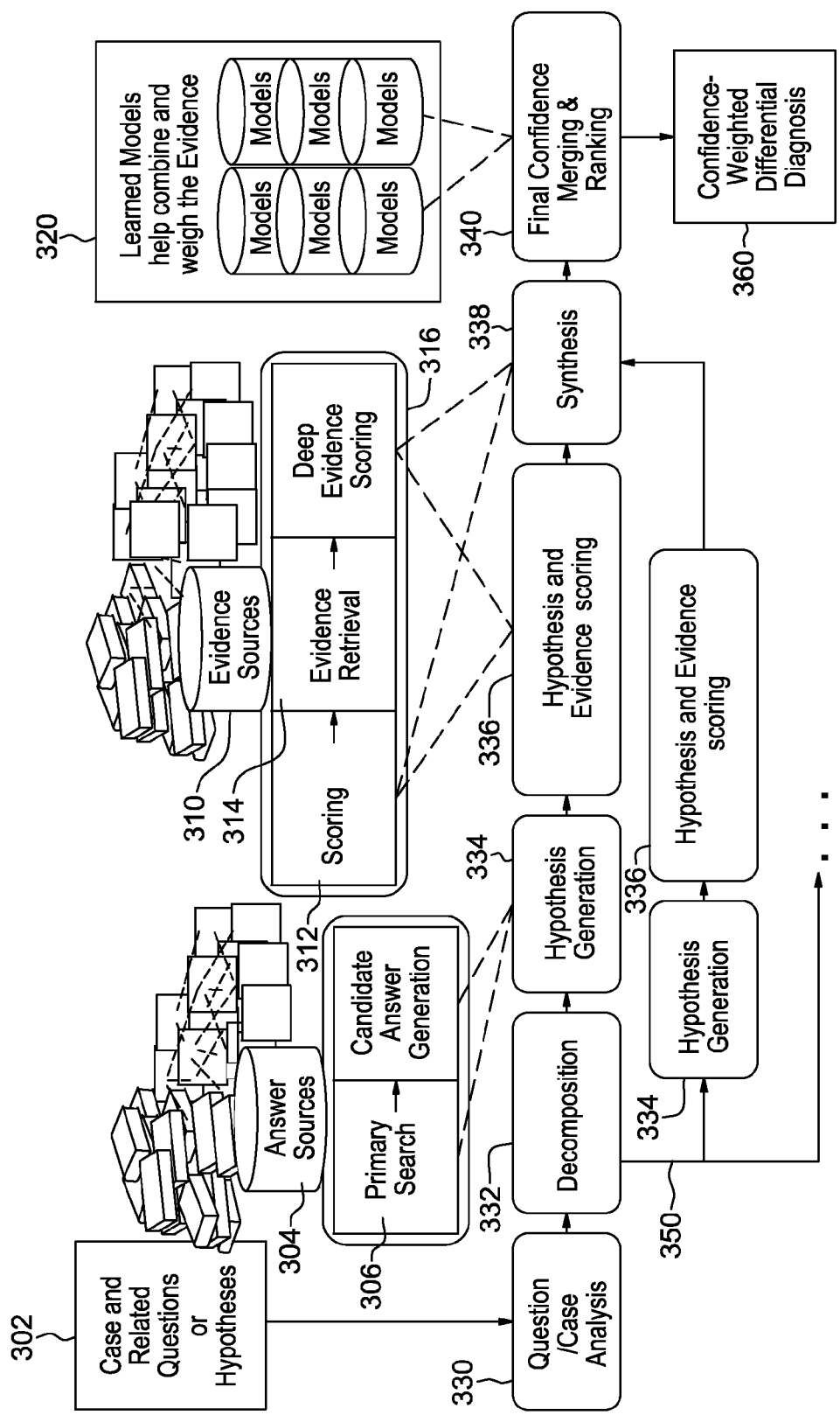
FIG. 1 is a schematic block diagram illustrating various aspects of embodiments herein.
Figure 2:
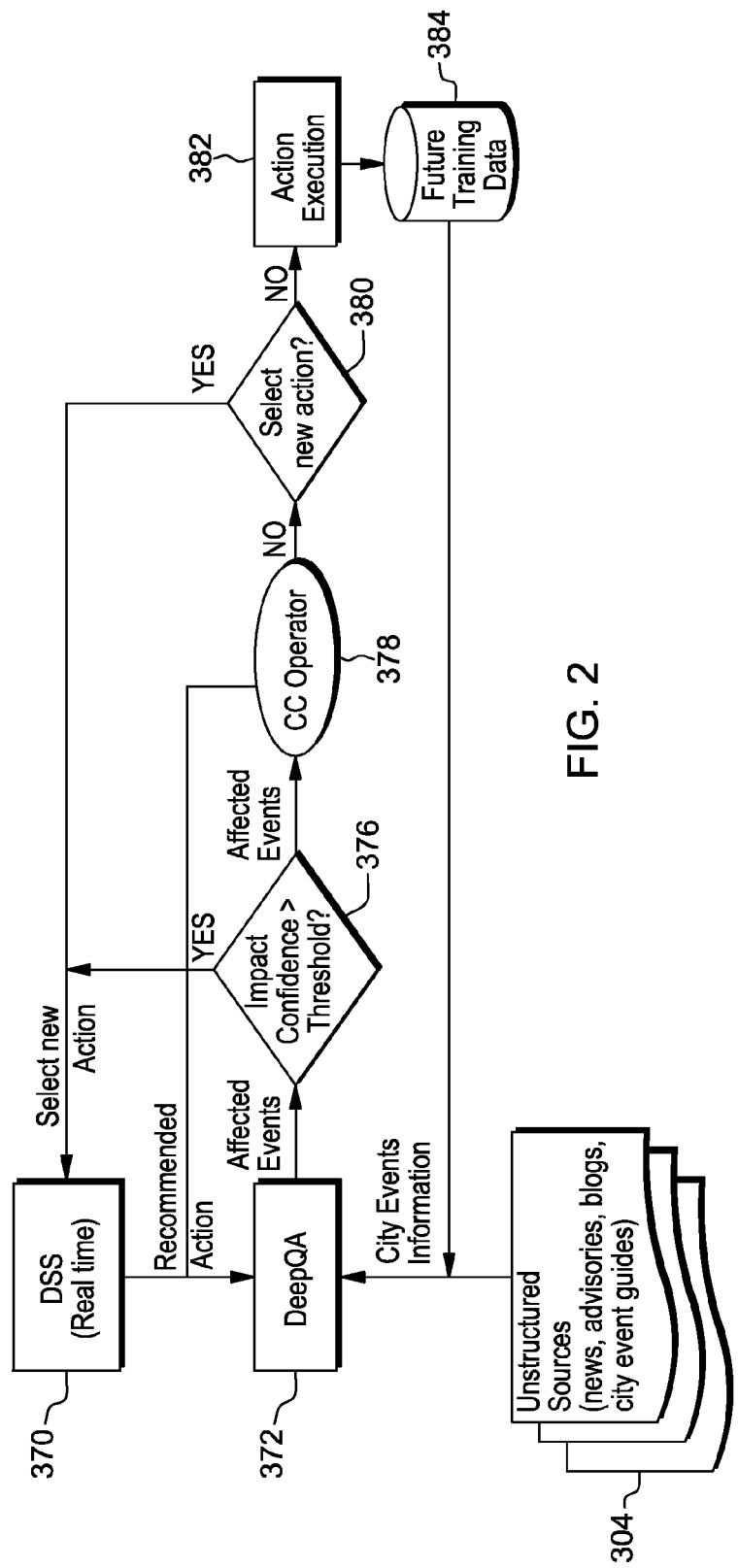
FIG. 2 is a schematic block diagram illustrating various aspects of embodiments herein.

Referring now to the drawings, and more particularly to FIGS. 1 and 2, the decision support system 370 uses a database of structured data to generate the suggested actions, while the question-answering system 372 uses unstructured data 304 from a variety of unrelated sources (separate from the database of structured data) to retrieve the answers and score the confidence/impact values. More specifically, a conventional decision support system will apply rules to such structured real-time information and produce a recommended action plan.

The methods and systems herein can execute predefined queries with information specified in the action plan, or accept natural language questions from the command center operators. The methods and systems herein add to such a system by automatically generating questions and automatically retrieving answers to such questions. As shown in FIG. 1, the methods and systems herein use a Case and Related Question or Hypotheses phase 302 to generate a set of hypotheses (Hypothesis Generation 334) for answers to questions using unstructured information as evidence and associate a level of confidence with each hypothesis. More specifically, the Case and Related Question or Hypotheses phase 302 generates Questions and a Case Analysis 330, which is decomposed 332 into the Hypothesis Generation 334.

In one non-limiting example used in this disclosure to illustrate the methods and systems herein (a transportation command center) an action plan from a DSS may recommend a set of traffic control actions targeted at a particular location at a specific time. For instance, one suggested action plan may be a set of suggested control actions that involve different controllable resources, such as the adaptive traffic signals at intersections. An example is shown in the table below:

TABLE 1

| Suggested Action | Type of Control | Description of Action | Start Time | End Time |
| --- | --- | --- | --- | --- |
| 1 | Signal Group 21 | Assist by 25% increase in green time to all signals in group | 4:15 pm | 4:45 pm |
| 2 | Signal Group 13 | Restrict by 20% green time in signals 13/1, 13/2, and 13/3 | 4:15 pm | 4:30 pm |

For command centers regarding other forms of transportation, suggested action plans are analogous in that they contain a type of control, a description of the action to perform, a start time and an ending time for the action. For a subway/metro/train system command center, the types of controls available include delaying trains at stations, running trains more slowly between stations, and advancing trains more quickly between stations. Hence, the analogous action plans for urban or interurban train command centers include which trains to delay, where to delay them, and which to advance more rapidly. For other types of command centers such as dispatch centers for emergency services (such as police, fire or other) a similar pattern can be employed where the controllable resources and the values that those can take are determined.

A predefined question that could be provided by embodiments herein asks about planned events and activities in the city that may affect or be affected by the action plan. Similarly, in an emergency services command center, an action plan may involve the deployment of fire rescue personnel to a particular area via a given route. A predefined question provided by embodiments herein asks about whether there are any obstructions to the route that are known by the community but not by the official transportation agency staff. The following table shows different predefined queries that could be made on Suggested Action 1 from Table 1, above.

TABLE 2

| Suggested Action ID | Zone of Impact | Time of Impact | Query ID | Predefined Queries | Response |
|---|---|---|---|---|---|
| 1 | Zone 213 | 8/21/11 16:00-17:00 | 1 | Are there any planned community events in the zone of impact? | No |
| 1 | Zone 213 | 8/21/11 16:00-17:00 | 2 | Are there any demonstrations or other unplanned events in the zone of impact? | Yes |

Thus, the systems and methods herein extract location and time information from the action plan provide by the DSS. Aspects of an action plan can be, for example, whether the action plan is predicted to increase or decrease traffic flow, direct or divert traffic flow in a particular area, the expected radius of impact, etc., and all such information is extracted by the systems and methods herein. Using this information, the Hypothesis Generation (sometimes referred to herein as question generation) phase 334 of the systems and methods herein issues a set of primary search queries 306 (sometimes referred to herein as questions) against its corpus of structured and unstructured answer sources 304. These unstructured answer sources 304 could be news websites, blogs with heavy traffic, advisories from city departments, city event guides, and other sources of unstructured information. They may also include any structured sources of data such as accident reports, police activity, and such structured sources may already be available to the DSS and the command center.

Once the search results (sometimes referred to herein as retrieved results) are returned, a feature herein that is sometimes referred to as the Candidate Answer Generation phase 308 identifies and extracts a set of answers, which are sometimes referred to herein as "events" from the unstructured search results. For example, such events could be location specific activities that have time attributes such as dates, days of the week, start time, end time and durations. An event could also span multiple locations and time durations. The Candidate Answer Generation phase 308 generates as many event hypotheses as possible, without regard to their relevance to the target control action.

Once a broad set of hypothetical events are generated, an operation referred to as the Hypothesis and Evidence Scoring phase 336 starts, where multiple scorers 312 assign features to each hypothesis. The following are some examples of scorers and features. A location scorer generates a feature based on the area of overlap or distance between the location of event and locations affected by the control action. A time-based scorer may reason about the time duration of an event and its overlap with the control action and generate a feature that quantifies this overlap. A crowd estimate scorer may use information about the event, such as text features from the event description and the number of messages about the event posted to social networks, to predict the number of people likely attending the event. A security impact scorer rates an event hypothesis based on expected security measures associated with an event. Other scorers assign event type (political, sports, etc.) features from the text description of the event.

The scorers 312 used by embodiments herein range from simple heuristics rules using shallow lexical pattern matching to deeper semantic reasoning scorers supported by evidence sources and domain ontologies. As an example of a simple heuristic, the presence of certain keywords, or their combinations, in the event description could be used by a security impact scorer to assign a feature value. At the other extreme, a location scorer could use ontologies that define location entities (e.g., buildings, landmarks, streets, neighborhoods) and their spatial relations to determine the overlap between the affected region of the control action and the event. Similarly, a temporal scorer could use temporal concepts (e.g., DateTime, durations) and relations to estimate the time overlap. Additionally, heuristic-based scorers herein can directly evaluate the impact of the event on the recommended control action. Further, the systems and methods herein can learn the combined impact of the effect of such event features on control actions during an off-line phase, as indicated by the item 320 in FIG. 1. Past instances of control actions that interacted with known event features are used as off-line training data to develop the learned models. The following table shows different features from supporting evidence of predefined Query 2 that could be made on Suggested Action 1 from Table 2, above.

TABLE 3

| Suggested Action ID | Query ID | Event ID | Candidate Events Identified | Location (Area of overlap) | Time overlap | Crowd Estimate | Security Impact [1-10] | Event Type |
|---|---|---|---|---|---|---|---|---|
| 1 | 2 | 1 | Demonstration in Union Square | 200 | 15 | 1000 | 2 | B |
| 1 | 2 | 2 | Political Rally at City Hall | 350 | 20 | 30000 | 8 | C |

As shown by item 350 in FIG. 1, the Decomposition 332 can result in many levels of Hypothesis Generation 334, Hypothesis and Evidence Scoring 336, etc., which are synthesized back together by the Synthesis phase 338. The learned models 320 are used to combine the features associated with each hypothetical event during the Final Confidence Merging and Ranking phase 340 of the systems and methods herein. Multiple instance variants of the same event are also merged in this Final Confidence Merging and Ranking phase 340, pooling their feature values. This combination of weighted feature values results in an overall confidence of each event hypothesis in its relevance to the control action recommended by the DSS, as indicated by the Confidence-Weighted Event List 360, in FIG. 1. In addition to event relevance, the learning models 320 may also estimate a confidence on the expected impact of the event on the control action. Using the relevance and impact confidences, the events can be ranked from highest confidence to lowest. The following table shows these rankings as "values" and associated confidence in the relevance and impact of different events of predefined Query 2 that could be made on Suggested Action 1 from Table 3, above.

TABLE 4

| Suggested Action ID | Query ID | Event ID | Relevance Value/Rank (Confidence) | Impact Value/Rank (Confidence) |
|---|---|---|---|---|
| 1 | 2 | 1 | 2 (80%) | 3 (70%) |
| 1 | 2 | 2 | 1 (95%) | 1 (90%) |
| 1 | 2 | 3 | 3 (75%) | 2 (80%) |

As shown in FIG. 2, the command center operators 378 can be alerted to events with relatively high confidence in relevance and high confidence in impact (above a confidence threshold 376). In cases of high confidence in impact, the DSS can be automatically triggered to re-run the action plan taking into account the new information provided by question-answer module (by operation of decision box 376). The following table shows the impact of the question/answer process upon the different suggested actions shown in Table 1, above.

TABLE 5

| Suggested Action ID | Type of Control | Description of Action | Start Time | End Time | QA Impact Factor |
|---|---|---|---|---|---|
| 1 | Signal Group 21 | Assist by 25% increase in green time to all signals in group | 4:15 pm | 4:45 pm | Likely impact from events. Reassess control plan. |
| 2 | Signal Group 13 | Restrict by 20% green time in signals 13/1, 13/2, and 13/3 | 4:15 pm | 4:30 pm | No expected impact from events |

Thus, what are produced are answers (events) and their confidences, both in terms of relevance and impact. This differentiates between impact of the event and the relevance of the event to the action plan using two confidence measures (generated from two learning models, one for impact and the other for relevance). Each of these different learning models generates a confidence level for a given action plan. The rank of an event according to each of these confidence levels is the "value" shown in Table 4.

Therefore, at least one suggested action is received from the DSS. Parameters of time, place, and potentially controllable resources are determined from the suggested action. Those parameters are used to create queries that are input to the QA system. The QA system retrieves answers in the form of events. Those events are ranked independently on relevance and impact based on the confidence values calculated from separate relevance and impact models. The event with the highest confidence value, even if that confidence is only 10%, is given a value of 1.

Thus, Table 4 shows a specific query (2) of a suggested action (1) having three events (1-3). Event (1) has a value (or rank) of 2 regarding its relevance (with an 80% confidence that the event (1) is relevant). To the contrary, a different event (2) has a value (or rank) of 1 regarding its relevance (with a 95% confidence that the event (2) is relevant); and event (3) has a value (or rank) of 3 regarding its relevance (with a 75% confidence that the event (3) is relevant).

However, the different learning model (for impact) produces different results. This event (1) has a value (or rank) of 3 regarding its impact (with only a 70% confidence that the event (1) has impact). To the contrary, the different event (2) has a value (or rank) of 1 regarding its impact (with a 90% confidence that the event (2) has impact); and event (3) has a value (or rank) of 2 regarding its impact (with a 80% confidence that the event (3) has impact).

The "predetermined limits" which control which queries will be automatically shown to the users (or that will cause the decision support system to re-run the action plan) can be any combination that consistently produces useful results. For example, some systems may see very positive results if only the top three ranking queries are used (and only those that have a confidence above 85%). Other installations could use other "predetermined limits" to fine tune the actions of the question-answer system, such as using only the top 2, top 5, top 10 ranking results (and the minimum confidence limit could be 50%, 75%, 90%, etc.).

Thus, for purposes herein there is a difference between "relevance" and "impact." An event is relevant to the action plan if the event and action item overlap in time or space. An event is considered to have an impact if it disrupts (or is disrupted by) the action plan. Therefore, high confidence in relevance does not imply high confidence in impact.

While two separate models are mentioned above with respect to impact and relevance, those ordinarily skilled in the art would understand that the same could be included within a single model. Similarly, each of the different elements discussed herein could be combined or separate (including the decision support system and question-answering system, etc.). In the case of an event that has a high confidence in its relevance to an action plan but medium-degree or low confidence in its impact, the command center personnel 378 can be alerted to the event. In such cases, and a re-run of the action plan by the DSS is not necessarily performed due to the uncertain or reduced likely impact of the events. However, an alert screen can provide the command center personnel 378 with a description of the event and assessment of its relevance and impact. This allows the command center personnel to perform a manual re-run of the DSS, if they determine the relevance and impact factors of the events dictate that an alteration of the control action is required (as shown in decision box 380). If the action plan is not to be re-run, it is executed in item 382. Further, the operators can provide feedback on the relevance of the events, which is used in future machine learning phase, as shown in item 384 in FIG. 2.

As shown in FIG. 1, with systems and methods herein, the operators are provided the option to drill down into each event hypothesis and observe the various dimensions of evidence (used in the Evidence Retrieval 314 and Deep Evidence Scoring 316) used by the feature scorers (and the weights of such evidence) and further drill down to the actual evidence sources 310 found in the unstructured information. This allows the operators to more fully understand and evaluate the events to make their own judgments as to relevance to and impact upon the actions of the action plan. Thus, the systems and methods herein provide a different metric than those produced by the internal domain-specific plan generation tool, which allows a more thorough and relevant assessment about the likely benefit of the suggested control plan.

Figure 3:
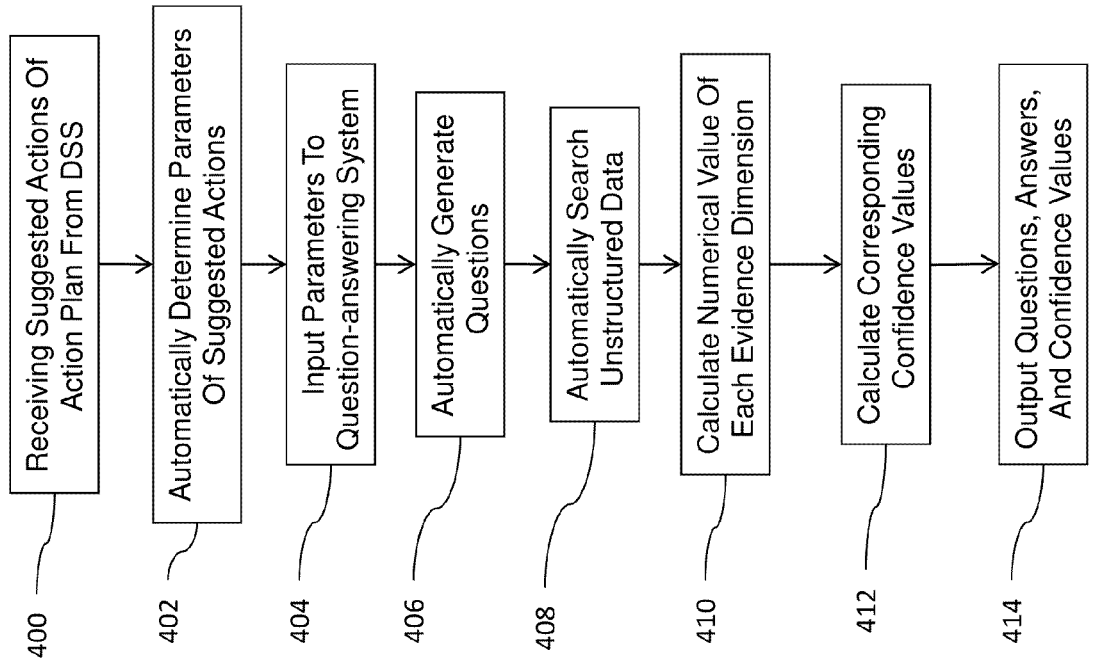
FIG. 3 is a flow diagram illustrating the processing flow of an exemplary method herein.

FIG. 3 is a flow diagram illustrating the processing flow of an exemplary method for providing decision support for a command center herein. In item 400, the flow begins by receiving suggested actions of an action plan from a decision support system into a particular computerized machine. In item 402, this exemplary method automatically determines parameters of the suggested actions (using the particular computerized machine). When determining the parameters, the method identifies semantic concepts, relations, and data within the suggested actions. These parameters are input to a question-answering system (operating on the particular computerized machine) in item 404. Examples of parameters are location, date, time range, type of controllable resource, and whether the availability of the resource is being increased or decreased by this action. Next, in item 406, the method automatically generates at least one question from the semantic concepts, relations, and data (using the question-answering system).

Thus, items 402-406 demonstrate how the processes go from the controllable resources identified within the action plan to the questions. More specifically, the systems and methods herein automatically analyze unstructured information, using an analysis module, in order to identify semantic concepts, relations and other relevant knowledge within the statements of the action plan concerning the controllable resources. Thus, the method identifies semantic concepts, relations and other relevant knowledge when the incoming statements of the action plan concerning the controllable resources is unstructured, such as natural language text, audio or images. Thus, the concepts, relations and other kinds of information relevant to the domain have to be identified and combined into questions. This is done by software components called "annotators". Annotators can be procedural code, rule based, using programmed logic or in many other forms for determining concepts, relations and other relevant information. They could, for example, be based on machine learning, using a set of training data containing known concepts and relations. Annotators can recognize phrases relating to action plan concepts and may also identify relations between entities.

For example, in case of automatic formulation, a set of "standing" questions can be designed as a template. The question templates can have blank slots for concepts. Once the semantic concepts and relations are identified, these fill in the blanks in the template, resulting in a synthesized question. The concept of a template is a general computational element for automatically constructing a set of relevant questions (queries) to the underlying question-answering system that is used to synthesize and return information relevant to the specific information need at hand. There are many ways to implement templates. For example, questions may be automatically generated based on what is known and unknown. For aiding the subsequent interpretation of the answers, a question may be converted into multiple questions. Each question in this set may contain a subset of the concepts found about the problem.

In item 408, this exemplary method automatically searches a corpus of unstructured data to retrieve answers to the questions using the question-answering system. The decision support system uses a database of structured data to generate the suggested actions, while the question-answering system uses unstructured data from a variety of unrelated sources (separate from the database of structured data) to retrieve the answers and score the confidence/impact values. The questions can comprise predefined questions, and the systems and methods herein can also receive and process natural language questions through the graphic user interface, and combine such natural language questions with the automatically generated questions when retrieving the answers.

This method can further automatically calculate a numerical value of each evidence dimension of the evidence sources for each of the answers in item 410, and automatically calculate corresponding confidence values for each of the answers based on the numerical value of each evidence dimension in item 412 (using the question-answering module). For each question submitted, the question-answering system returns a list of answers, their confidences, evidence dimensions, and evidence sources. The confidence of each answer can, for example, be a number between 0 and 10, a percentage, etc. This confidence is constructed from various answer scorers in the question-answering system, which evaluates the impact/relevance correctness of the answer according to various dimensions of evidence sources. For example, a candidate answer can be evaluated in terms of the semantic type of the answer. For every answer to a question, the passages of domain knowledge from which the answer was extracted are also available from the question-answering system. This can be snippets of text that match the structure of the question or entire documents that were returned from search components during the question-answering process. For each passage, a citation to the original source of information is also recorded.

The method further automatically calculates dimension values of the evidence from the evidence sources for each of the answers using the question-answering module and calculates corresponding confidence values for each of the answers based on the dimension values using the question-answering module. The dimension values of the evidence sources can be based upon data from many different sources and may include demographics, etc.

The above processes described methods of formulating multiple questions containing a subset of the concepts found in the problem text. By analyzing answers and their confidences for these answers, an estimate of the marginal contribution of these concepts can be generated. For the example for the answers generated, the marginal impact of findings, demographics, etc., are calculated.

The questions, answers, and confidence values are then output using a graphic user interface of the particular computerized machine in item 414. In some embodiments, the output can be limited to only those answers that have an impact confidence level and a relevance confidence level that are above predetermined confidence thresholds.

In addition (instead of outputting the questions, answers, and impact values) if the answers have a degree of impact value and a relevance confidence value that are above predetermined confidence thresholds, the systems and methods herein can cause the decision support system to reproduce (re-run) the action plan to generate a new action plan that has modified suggested actions that are different than the previously generated suggested actions. The decision support system can use the questions, answers, and impact values produced by the question-answer system when rerunning the action plan. To the contrary, if the answers have a degree of impact value and a relevance confidence value that are below the predetermined confidence thresholds, the methods and systems herein can output the questions, answers, and impact values, without requiring the decision support system to reproduce the action plan.

In addition, the methods and systems herein can monitor the actions of the operator after the questions and answers are output to the operator to note whether the operator made changes to the action plan. Using such information, the embodiments herein can update the learning model of the question-answering system to continually make the question-answering system better.

Thus, the method and systems herein output the questions, the answers, the corresponding confidence values, and the dimension values of the evidence sources. When outputting the dimension values of the evidence from the evidence sources, this graphic user interface can illustrate the amount each of the dimension values of the evidence sources contributes to a corresponding confidence value (on a scale or percentage basis, for example) and illustrate how changes in each of the dimension values of the evidence sources produce changes in the corresponding confidence value. The embodiments herein automatically and continuously update the answers, the corresponding confidence values, and the dimension values of the evidence sources based on constant changes in the unstructured information sources as time goes by to keep the decision maker constantly informed as the situation changes over time.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more non-transitory computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or 2-D block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Figure 4:
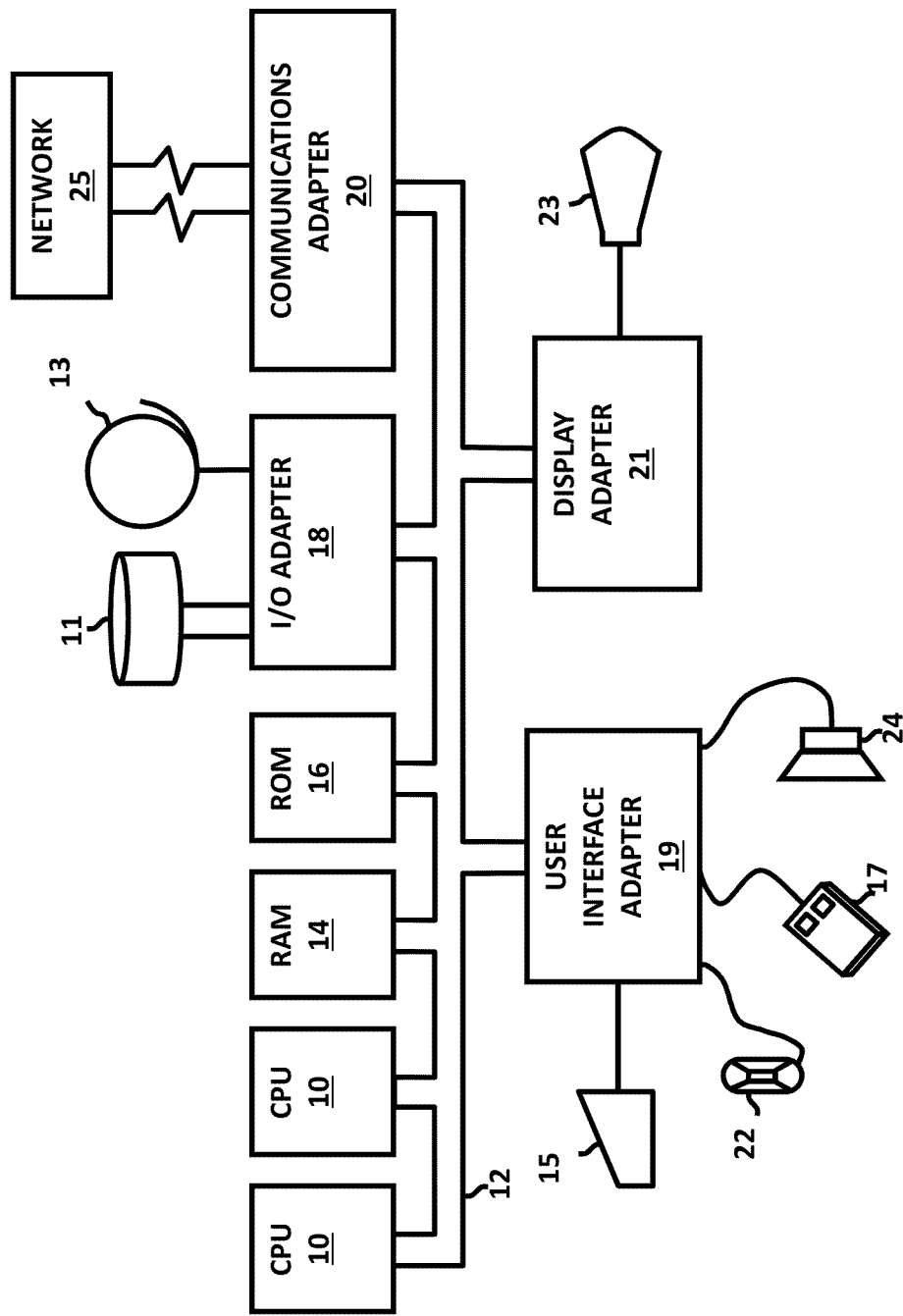
FIG. 4 is a schematic diagram of a hardware system according to embodiments herein.

A representative hardware environment for practicing the embodiments of the disclosure is depicted in FIG. 4. This schematic drawing illustrates a hardware configuration of an information handling/computer system in accordance with the embodiments of the disclosure. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments of the disclosure. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

Thus, as shown in FIG. 4, a computerized machine embodiment for providing decision support for a command center herein includes an input/output port 18 receiving suggested actions from a rule-based decision support system. Also, a processor 10 is operatively connected to the input/output port 18. The processor 10 automatically determines parameters of the suggested actions to serve as input to a question-answering system operating on the computerized machine. The computerized machine shown in FIG. 4 can be use to operate the decision support system, the question-answering system, or both.

The question-answering system automatically generates questions based on the parameters and then automatically searches a corpus of unstructured data to retrieve answers to the questions. Again, examples of parameters are location, date, time range, type of controllable resource, and whether the availability of the resource is being increased or decreased by this action.

Further, the question-answering system automatically provides impact values for each question and/or answer indicating the degree of impact each question and/or answer will have on the suggested actions. Additionally, the graphic user interface 15, 17, 19, 21, 22-24 is operatively connected to the processor 10. The graphic user interface outputs the questions, the answers, and the impact/relevance values to the user.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Deployment types include loading directly in the client, server and proxy computers via loading a storage medium such as a CD, DVD, etc. The process software may also be automatically or semi-automatically deployed into a computer system by sending the process software to a central server or a group of central servers. The process software is then downloaded into the client computers that will execute the process software. The process software is sent directly to the client system via e-mail. The process software is then either detached to a directory or loaded into a directory by a button on the e-mail that executes a program that detaches the process software into a directory. Send the process software directly to a directory on the client computer hard drive. When there are proxy servers, the process will, select the proxy server code, determine on which computers to place the proxy servers' code, transmit the proxy server code, and then install the proxy server code on the proxy computer. The process software will be transmitted to the proxy server then stored on the proxy server.

While it is understood that the process may be deployed by manually loading directly in the client, server and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by a button on the e-mail that executes a program that detaches the process software into a directory. Another alternative is to send the process software directly to a directory on the client computer hard drive. When there are proxy servers, the process will, select the proxy server code, determine on which computers to place the proxy servers' code, transmit the proxy server code, then install the proxy server code on the proxy computer. The process software will be transmitted to the proxy server then stored on the proxy server.

Figure 5:
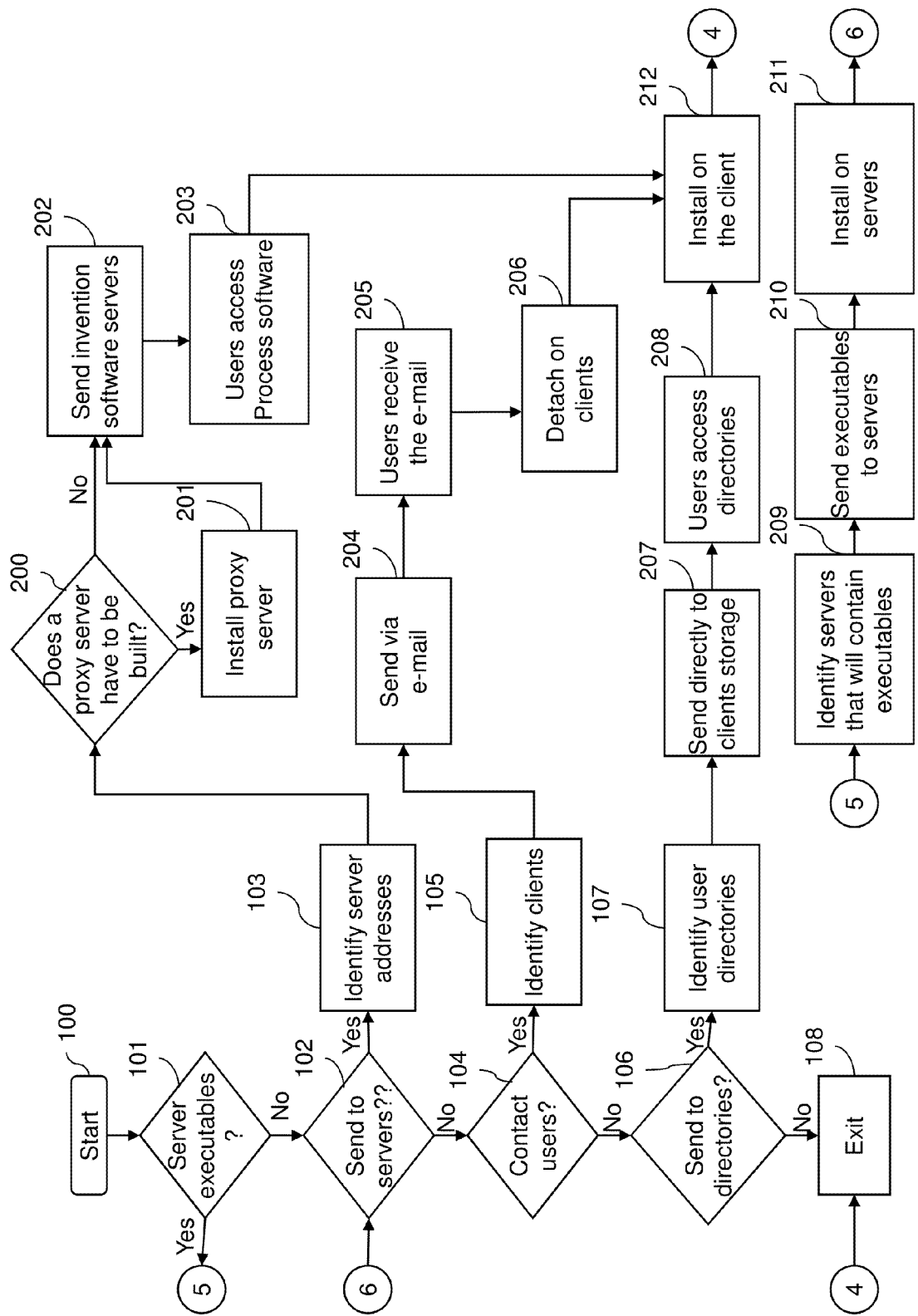
FIG. 5 is a schematic diagram of a deployment system according to embodiments herein.

As shown in FIG. 5, step 100 begins the deployment of the process software. The first thing is to determine if there are any programs that will reside on a server or servers when the process software is executed 101. If this is the case, then the servers that will contain the executables are identified 209. The process software for the server or servers is transferred directly to the servers' storage via FTP, or some other protocol, or by copying through the use of a shared file system 210. The process software is then installed on the servers 211.

Next, a determination is made on whether the process software is be deployed by having users access the process software on a server or servers 102. If the users are to access the process software on servers, then the server addresses that will store the process software are identified 103.

A determination is made if a proxy server is to be built 200 to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required then the proxy server is installed 201. The process software is sent to the servers either via a protocol such as FTP or it is copied directly from the source files to the server files via file sharing 202. Another embodiment would be to send a transaction to the servers that contained the process software and have the server process the transaction, then receive and copy the process software to the server's file system. Once the process software is stored at the servers, the users via their client computers, then access the process software on the servers and copy to their client computers file systems 203. Another embodiment is to have the servers automatically copy the process software to each client and then run the installation program for the process software at each client computer. The user executes the program that installs the process software on his client computer 212, and then exits the process 108.

In step 104 a determination is made whether the process software is to be deployed by sending the process software to users via e-mail. The set of users where the process software will be deployed are identified together with the addresses of the user client computers 105. The process software is sent via e-mail to each of the users' client computers 204. The users then receive the e-mail 205 and then detach the process software from the e-mail to a directory on their client computers 206. The user executes the program that installs the process software on his client computer 212 then exits the process 108.

Lastly, a determination is made on whether the process software will be sent directly to user directories on their client computers 106. If so, the user directories are identified 107. The process software is transferred directly to the user's client computer directory 207. This can be done in several ways, such as, but not limited to, sharing of the file system directories and then copying from the sender's file system to the recipient user's file system or, alternatively using a transfer protocol such as File Transfer Protocol (FTP). The users access the directories on their client file systems in preparation for installing the process software 208. The user executes the program that installs the process software on his client computer 212 then exits the process 108.

The process software is integrated into a client, server and network environment by providing for the process software to coexist with applications, operating systems and network operating systems software and then installing the process software on the clients and servers in the environment where the process software will function.

The first step is to identify any software on the clients and servers including the network operating system where the process software will be deployed that are required by the process software or that work in conjunction with the process software. This includes the network operating system that is software that enhances a basic operating system by adding networking features.

Next, the software applications and version numbers will be identified and compared to the list of software applications and version numbers that have been tested to work with the process software. Those software applications that are missing or that do not match the correct version will be upgraded with the correct version numbers. Program instructions that pass software parameters from the process software to the software applications will be checked to ensure the parameter lists matches the parameter lists required by the process software. Note that the software parameters are different than the parameters of the suggested actions, discussed elsewhere in this application. Conversely, software parameters passed by the software applications to the process software will be checked to ensure the software parameters match the software parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

Figure 6:
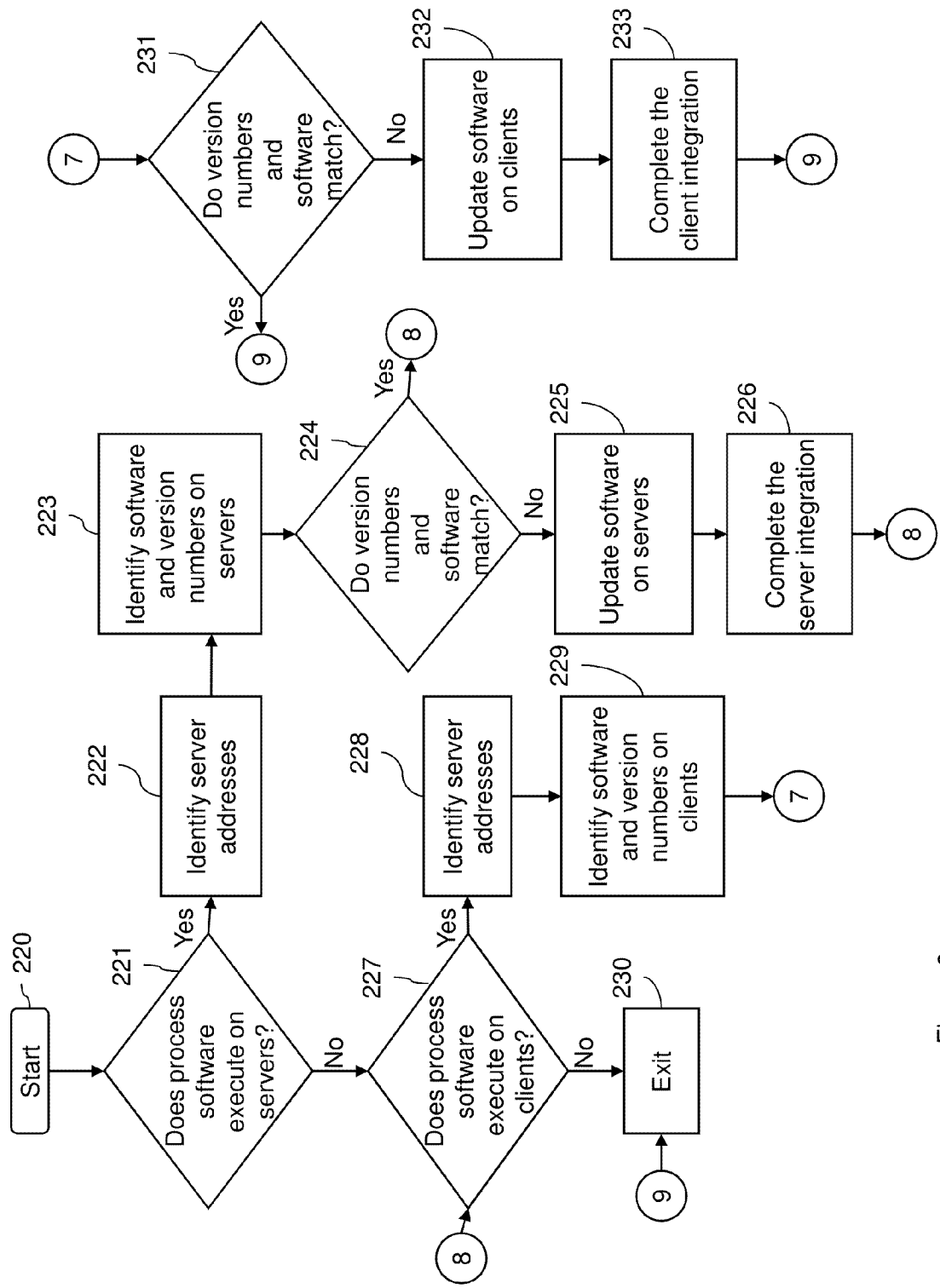
FIG. 6 is a schematic diagram of an integration system according to embodiments herein.

As shown in FIG. 6, step 220 begins the integration of the process software. The first thing is to determine if there are any process software programs that will execute on a server or servers 221. If this is not the case, then integration proceeds to 227. If this is the case, then the server addresses are identified 222. The servers are checked to see if they contain software that includes the operating system (OS), applications, and network operating systems (NOS), together with their version numbers, that have been tested with the process software 223. The servers are also checked to determine if there is any missing software that is required by the process software 223.

A determination is made if the version numbers match the version numbers of OS, applications and NOS that have been tested with the process software 224. If all of the versions match and there is no missing required software the integration continues in 227.

If one or more of the version numbers do not match, then the unmatched versions are updated on the server or servers with the correct versions 225. Additionally, if there is missing required software, then it is updated on the server or servers 225. The server integration is completed by installing the process software 226.

Step 227 which follows either 221, 224 or 226 determines if there are any programs of the process software that will execute on the clients. If no process software programs execute on the clients the integration proceeds to 230 and exits. If this not the case, then the client addresses are identified 228.

The clients are checked to see if they contain software that includes the operating system (OS), applications, and network operating systems (NOS), together with their version numbers, that have been tested with the process software 229. The clients are also checked to determine if there is any missing software that is required by the process software 229.

A determination is made as to whether the version numbers match the version numbers of OS, applications and NOS that have been tested with the process software 231. If all of the versions match and there is no missing required software, then the integration proceeds to 230 and exits.

If one or more of the version numbers do not match, then the unmatched versions are updated on the clients with the correct versions 232. In addition, if there is missing required software then it is updated on the clients 232. The client integration is completed by installing the process software on the clients 233. The integration proceeds to 230 and exits.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally, the assessed server may make requests of other servers that require CPU units. CPU units are an example that represents but one measurement of use. Other measurements of use include, but are not limited to, network bandwidth, memory usage, storage usage, packet transfers, complete transactions etc. When multiple customers use the same process software application, their transactions are differentiated by the software parameters included in the transactions that identify the unique customer and the type of service for that customer. All of the CPU units and other measurements of use that are used for the services for each customer are recorded. When the number of transactions to any one server reaches a number that begins to effect the performance of that server, other servers are accessed to increase the capacity and to share the workload. Likewise, when other measurements of use such as network bandwidth, memory usage, storage usage, etc., approach a capacity so as to effect performance, additional network bandwidth, memory usage, storage etc., are added to share the workload. The measurements of use used for each service and customer are sent to a collecting server that sums the measurements of use for each customer for each service that was processed anywhere in the network of servers that provide the shared execution of the process software. The summed measurements of use units are periodically multiplied by unit costs, and the resulting total process software application service costs are alternatively sent to the customer and are indicated on a web site accessed by the customer which then remits payment to the service provider. In another embodiment, the service provider requests payment directly from a customer account at a banking or financial institution. In another embodiment, if the service provider is also a customer that uses the process software application, the payment owed to the service provider is reconciled to the payment owed by the service provider to minimize the transfer of payments.

The process software is shared, simultaneously serving multiple customers in a flexible, automated fashion. It is standardized, requiring little customization and it is scalable, providing capacity on demand in a pay-as-you-go model. The process software can be stored on a shared file system accessible from one or more servers. The process software is executed via transactions that contain data and server processing requests that use CPU units on the accessed server. CPU units are units of time such as minutes, seconds, hours on the central processor of the server. Additionally, the assessed server may make requests of other servers that require CPU units. CPU units are an example that represents but one measurement of use. Other measurements of use include, but are not limited to, network bandwidth, memory usage, storage usage, packet transfers, complete transactions etc.

When multiple customers use the same process software application, their transactions are differentiated by the software parameters included in the transactions that identify the unique customer and the type of service for that customer. All of the CPU units and other measurements of use that are used for the services for each customer are recorded. When the number of transactions to any one server reaches a number that begins to effect the performance of that server, other servers are accessed to increase the capacity and to share the workload. Likewise, when other measurements of use such as network bandwidth, memory usage, storage usage, etc. approach a capacity so as to effect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Figure 7:
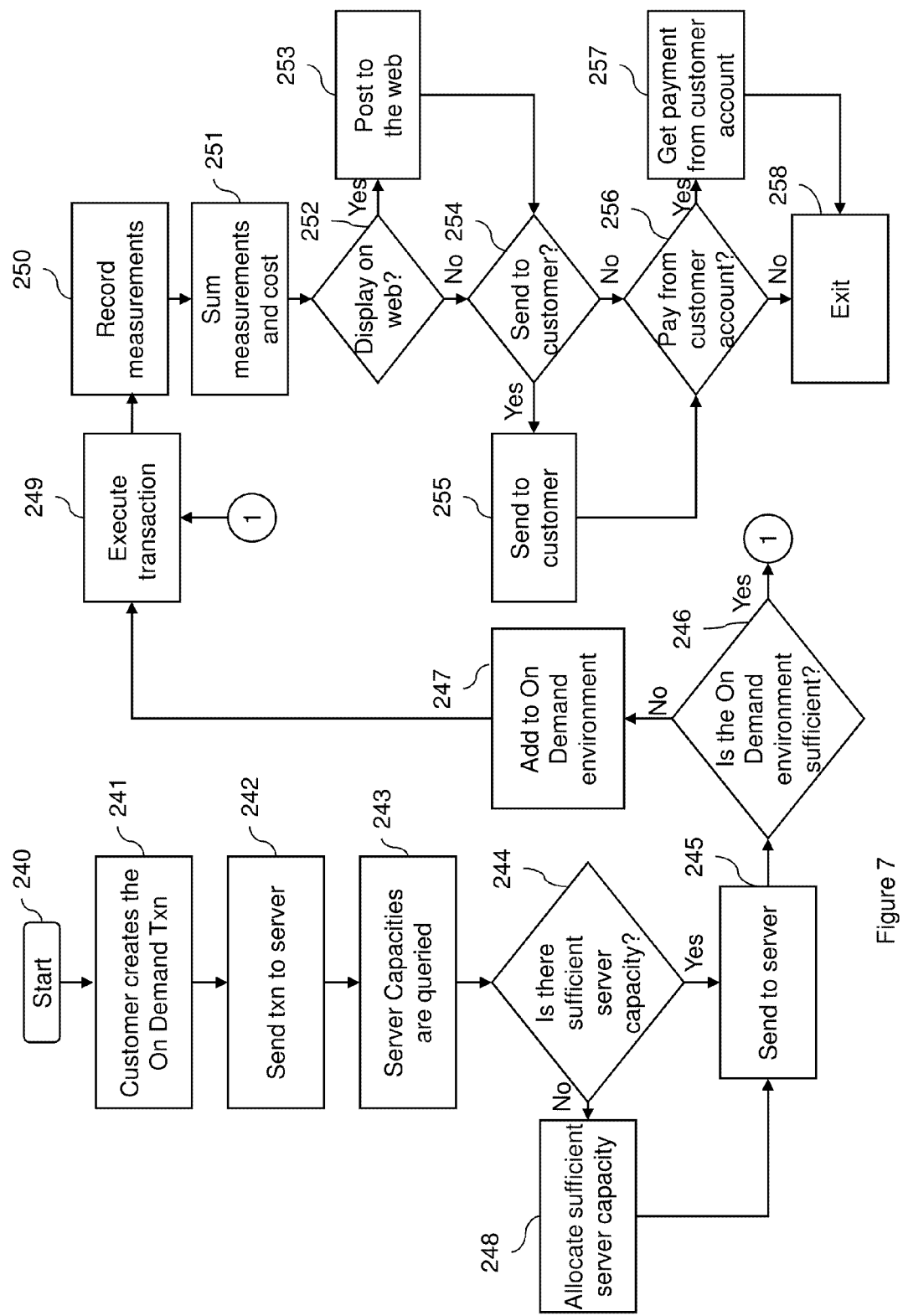
FIG. 7 is a schematic diagram of an on demand system according to embodiments herein.

As shown in FIG. 7, step 240 begins the On Demand process. A transaction is created that contains the unique customer identification, the requested service type and any service software parameters that further specify the type of service 241. The transaction is then sent to the main server 242. In an On Demand environment the main server can initially be the only server, then, as capacity is consumed, other servers are added to the On Demand environment.

The server central processing unit (CPU) capacities in the On Demand environment are queried 243. The CPU requirement of the transaction is estimated, then the servers available CPU capacity in the On Demand environment are compared to the transaction CPU requirement to see if there is sufficient CPU available capacity in any server to process the transaction 244. If there is not sufficient server CPU available capacity, then additional server CPU capacity is allocated to process the transaction 248. If there was already sufficient Available CPU capacity then the transaction is sent to a selected server 245.

Before executing the transaction, a check is made of the remaining On Demand environment to determine if the environment has sufficient available capacity for processing the transaction. This environment capacity consists of such things as but not limited to network bandwidth, processor memory, storage etc. 246. If there is not sufficient available capacity, then capacity will be added to the On Demand environment 247. Next, the required software to process the transaction is accessed, loaded into memory, then the transaction is executed 249.

The usage measurements are recorded 250. The usage measurements consist of the portions of those functions in the On Demand environment that are used to process the transaction. The usage of such functions is, but not limited to, network bandwidth, processor memory, storage and CPU cycles are what is recorded. The usage measurements are summed, multiplied by unit costs and then recorded as a charge to the requesting customer 251. If the customer has requested that the On Demand costs be posted to a web site 252 then they are posted 253.

If the customer has requested that the On Demand costs be sent via e-mail to a customer address 254 then they are sent 255. If the customer has requested that the On Demand costs be paid directly from a customer account 256 then payment is received directly from the customer account 257. The last step is exit the On Demand process 258.

The process software may be deployed, accessed and executed through the use of a virtual private network (VPN), which is any combination of technologies that can be used to secure a connection through an otherwise unsecured or untrusted network. The use of VPNs is to improve security and for reduced operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee.

The process software may be deployed, accessed and executed through either a remote-access or a site-to-site VPN. When using the remote-access VPNs, the process software is deployed, accessed, and executed via the secure, encrypted connections between a company's private network and remote users through a third-party service provider. The enterprise service provider (ESP) sets a network access server (NAS) and provides the remote users with desktop client software for their computers. The telecommuters can then dial a toll-free number or attach directly via a cable or DSL modem to reach the NAS and use their VPN client software to access the corporate network and to access, download and execute the process software.

When using the site-to-site VPN, the process software is deployed, accessed and executed through the use of dedicated equipment and large-scale encryption that are used to connect a company's multiple fixed sites over a public network such as the Internet. The process software is transported over the VPN via tunneling which is the process of placing an entire packet within another packet and sending it over a network. The protocol of the outer packet is understood by the network and both points, called tunnel interfaces, where the packet enters and exits the network.

Figure 8:
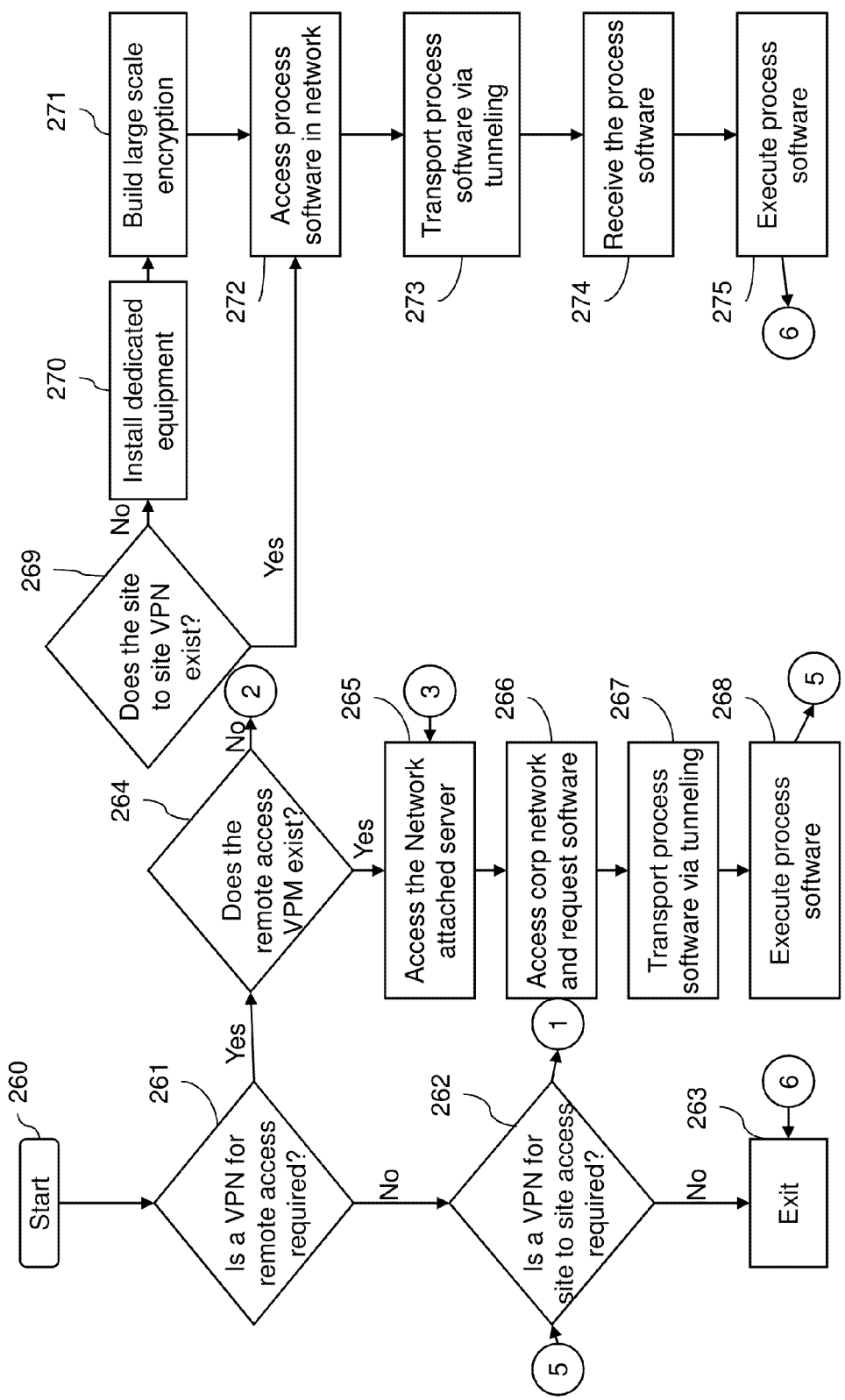
FIG. 8 is a schematic diagram of a virtual private network system according to embodiments herein.

As shown in FIGS. 8-9, step 260 begins the Virtual Private Network (VPN) process. A determination is made to see if a VPN for remote access is required 261. If it is not required, then proceed to 262. If it is required, then determine if the remote access VPN exists 264. If it does exist, then proceed to 265. Otherwise identify the third party provider that will provide the secure, encrypted connections between the company's private network and the company's remote users 276. The company's remote users are identified 277. The third party provider then sets up a network access server (NAS) 278 that allows the remote users to dial a toll free number or attach directly via a cable or DSL modem to access, download and install the desktop client software for the remote-access VPN 279.

After the remote access VPN has been built, or if it has been previously installed, the remote users can then access the process software by dialing into the NAS or attaching directly via a cable or DSL modem into the NAS 265. This allows entry into the corporate network where the process software is accessed 266. The process software is transported to the remote user's desktop over the network via tunneling. That is, the process software is divided into packets and each packet including the data and protocol is placed within another packet 267. When the process software arrives at the remote user's desktop, it is removed from the packets, reconstituted and then is executed on the remote users desktop 268.

A determination is made to see if a VPN for site to site access is required 262. If it is not required, then proceed to exit the process 263. Otherwise, determine if the site to site VPN exists 269. If it does exist, then proceed to 272. Otherwise, install the dedicated equipment required to establish a site to site VPN 270. Then, build the large scale encryption into the VPN 271.

After the site to site VPN has been built or if it had been previously established, the users access the process software via the VPN 272. The process software is transported to the site users over the network via tunneling 273. That is, the process software is divided into packets and each packet including the data and protocol is placed within another packet 274. When the process software arrives at the remote user's desktop, it is removed from the packets, reconstituted and is executed on the site users desktop 275. Proceed to exit the process 263.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A method for providing decision support comprising:
   receiving an action plan comprising suggested actions from a decision support system into a particular computerized machine;
   automatically determining parameters of said suggested actions using said particular computerized machine to serve as input to a question-answering system operating on said particular computerized machine;
   automatically generating questions based on said parameters using said question-answering system;
   automatically searching a corpus of unstructured data to retrieve answers to said questions using said question-answering system;
   automatically providing impact confidence values for each answer indicating degree of impact said answers have on said suggested actions using said question-answering system; and
   if said answers have an impact confidence value and a relevance confidence value that are above predetermined confidence thresholds, causing said decision support system to reproduce said action plan with modified suggested actions that are different than said suggested actions using said questions, said answers, and said impact confidence values.

2. The method according to claim 1, further comprising ranking said answers according to said impact confidence values using said question-answering system and outputting rankings.

3. The method according to claim 1, said providing of said impact confidence values comprising calculating an impact correctness of each answer according to various dimensions of evidence sources using answer scoring modules within said question-answering system.

4. The method according to claim 1, further comprising automatically providing relevance confidence values for each answer indicating degree of relevance said answers have to said suggested actions using said question-answering system; and outputting said relevance confidence values.

5. The method according to claim 1, said answers comprising events.

6. The method according to claim 1, said decision support system using a database of structured data to generate said suggested actions, and said question-answering system using said unstructured data from a variety of unrelated sources separate from said database of structured data to retrieve said answers.

7. The method according to claim 1, said answers being limited to ones that have an impact confidence value and a relevance confidence value that are above predetermined confidence thresholds.

8. The method according to claim 1, further comprising updating a learning model of said question-answering system based on input received in response to said questions, said answers, and said impact confidence values.

9. A method for providing decision support comprising:
   receiving suggested actions from a decision support system into a particular computerized machine;
   automatically determining parameters of said suggested actions using said particular computerized machine to serve as input to a question-answering system operating on said particular computerized machine;
   automatically generating questions based on said parameters using said question-answering system;
   automatically searching a corpus of unstructured data to retrieve answers to said questions using said question-answering system;
   automatically providing impact confidence values for each answer indicating degree of impact said answers have on said suggested actions using said question-answering system;

automatically providing relevance confidence values for each answer indicating degree of relevance said answers have to said suggested actions using said question-answering system;

if said answers have an impact confidence value and a relevance confidence value that are above predetermined confidence thresholds, causing said decision support system to reproduce an action plan with modified suggested actions that are different than said suggested actions using said questions, said answers, and said impact confidence values instead of performing outputting of said questions, said answers, said relevance confidence values, and said impact confidence values; and if said answers have an impact confidence value and a relevance confidence value that are below said predetermined confidence thresholds, performing said outputting of said questions, said answers, said relevance confidence values, and said impact confidence values on a graphic user interface without causing said decision support system to reproduce said action plan.

10. The method according to claim 9, further comprising ranking said answers according to said impact confidence values and said relevance confidence values using said question-answering system and outputting rankings using said graphic user interface.

11. The method according to claim 9, said providing of said impact confidence values comprising calculating an impact correctness of each answer according to various dimensions of evidence sources using answer scoring modules within said question-answering system.

12. The method according to claim 9, said providing of said relevance confidence values comprising calculating a relevance correctness of each answer according to various dimensions of evidence sources using answer scoring modules within said question-answering system.

13. The method according to claim 9, said answers comprising events.

14. The method according to claim 9, said decision support system using a database of structured data to generate said suggested actions, and said question-answering system using said unstructured data from a variety of unrelated sources separate from said database of structured data to retrieve said answers.

15. The method according to claim 9, said outputting being limited to said answers that have an impact confidence value and a relevance confidence value that are above predetermined confidence thresholds.

16. The method according to claim 9, further comprising updating a learning model of said question-answering system based on input received in response to said outputting of said questions, said answers, said relevance confidence values, and said impact confidence values.

17. A computerized machine for providing decision support for a command center comprising:
an input/output port receiving suggested actions from a decision support system;
a processor operatively connected to said input/output port, said processor:
automatically determining parameters of said suggested actions to serve as input to a question-answering system;
automatically generating questions based on said parameters;
automatically searching a corpus of unstructured data to retrieve answers to said questions; and
automatically providing impact confidence values for each answer indicating degree of impact said answers have on said suggested actions; and
a graphic user interface operatively connected to said processor, said graphic user interface outputting said questions, said answers, and said impact confidence values,
if said answers have an impact confidence value and a relevance confidence value that are above predetermined confidence thresholds, said processor causing said decision support system to reproduce an action plan with modified suggested actions that are different than said suggested actions using said questions, said answers, and impact confidence values instead of said graphic user interface outputting said questions, said answers, relevance confidence values, and said impact confidence values; and
if said answers have an impact confidence value and a relevance confidence value that are below said predetermined confidence thresholds, said graphic user interface outputting said questions, said answers, said relevance confidence values, and said impact confidence values without causing said decision support system to reproduce said action plan.

18. The system according to claim 17, said question-answering system ranking said answers according to said impact confidence values, and said graphic user interface outputting rankings.

19. The system according to claim 17, said question-answering system providing said impact confidence values by calculating an impact correctness of each answer according to various dimensions of evidence sources using answer scoring modules within said question-answering system.

20. The system according to claim 17, said question-answering system automatically providing relevance confidence values for each answer indicating degree of relevance said answers have to said suggested actions; and said graphic user interface outputting said relevance confidence values.

21. The system according to claim 17, said answers comprising events.

22. The system according to claim 17, said decision support system using a database of structured data to generate said suggested actions, and said question-answering system using said unstructured data from a variety of unrelated sources separate from said database of structured data to retrieve said answers.

23. The system according to claim 17, said processor limiting said outputting of said answers to said answers that have a degree of impact confidence value and a relevance confidence value that are above predetermined confidence thresholds.

24. The system according to claim 17, further comprising a learning model of said question-answering system, said learning model being updated based on input received in response to said outputting of said questions, said answers, and said impact confidence values.

25. A computer readable storage medium readable by a computerized device, said computer readable storage medium storing instructions executable by said computerized device to perform a method for providing decision support for a command center, said method comprising:
receiving suggested actions from a decision support system;
automatically determining parameters of said suggested actions to serve as input to a question-answering system;
automatically generating questions based on said parameters;

automatically searching a corpus of unstructured data to retrieve answers to said questions;

automatically providing impact confidence values for each answer indicating degree of impact said answers have on said suggested actions;

if said answers have an impact confidence value and a relevance confidence value that are above predetermined confidence thresholds, causing said decision support system to reproduce an action plan with modified suggested actions that are different than said suggested actions using said questions, said answers, and impact confidence values instead of performing outputting of said questions, said answers, relevance confidence values, and said impact confidence values; and if said answers have an impact confidence value and a relevance confidence value that are below said predetermined confidence thresholds, performing said outputting of said questions, said answers, said relevance confidence values, and said impact confidence values on a graphic user interface without causing said decision support system to reproduce said action plan.

\* \* \* \* \*